S. C. JOHNSON.
TRUCK.
APPLICATION FILED FEB. 20, 1911.
1,035,352.
Patented Aug. 13, 1912.
2 SHEETS—SHEET 2.
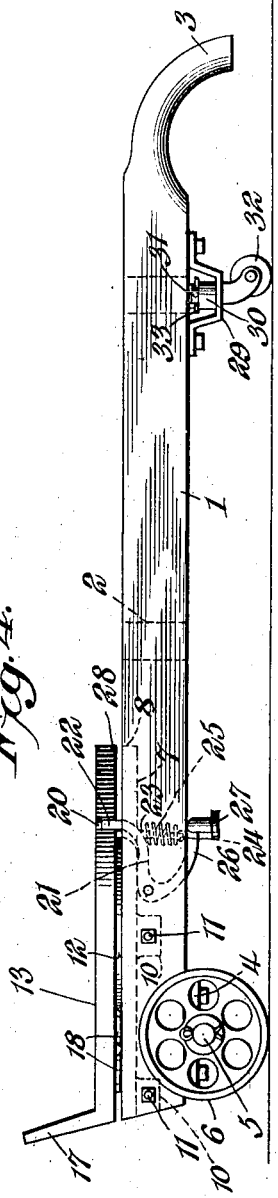
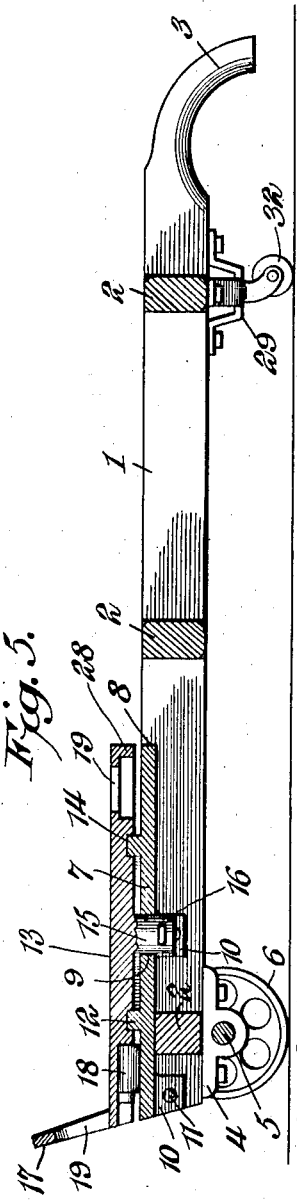
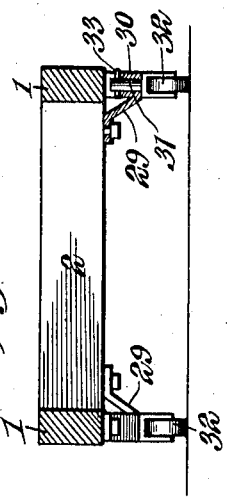
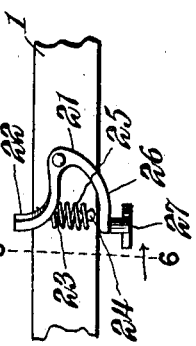
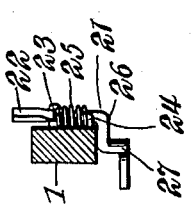
WITNESSES
Howard D. Orr
F. T. Chapman
Simon C. Johnson, INVENTOR,
BY E. G. Siggers
ATTORNEY

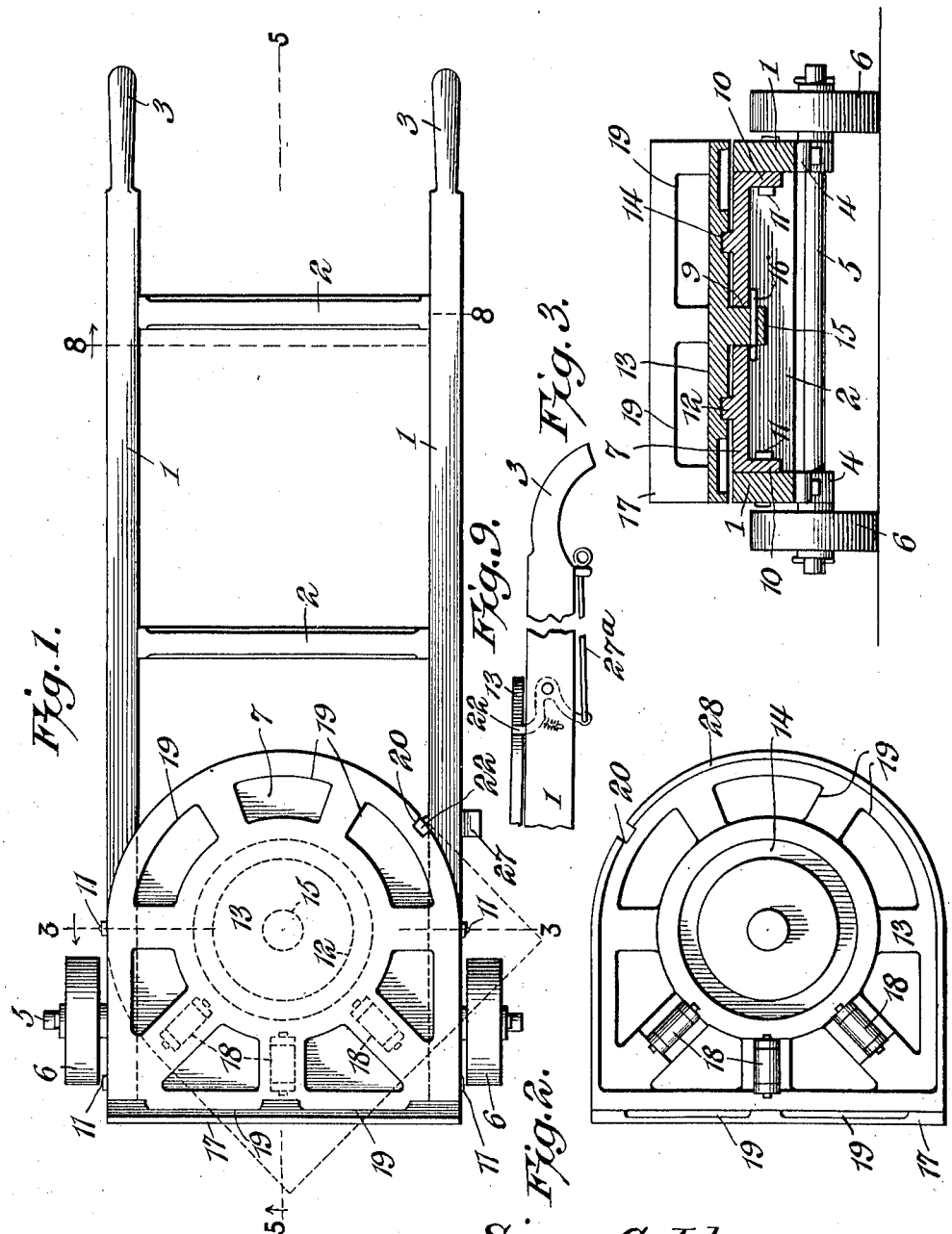

UNITED STATES PATENT OFFICE.

SIMON C. JOHNSON, OF DE KALB, ILLINOIS.

TRUCK.

1,035,352.  Specification of Letters Patent.  Patented Aug. 13, 1912.

Application filed February 20, 1911. Serial No. 609,667.

*To all whom it may concern:*

Be it known that I, SIMON C. JOHNSON, a citizen of the United States, residing at De Kalb, in the county of Dekalb and State of Illinois, have invented a new and useful Truck, of which the following is a specification.

This invention has reference to improvements in trucks of the kind used for warehouses and other places for the moving of heavy articles by manual labor, and its object is to provide a wheeled hand truck which may be used in the ordinary manner or which may be used in conjunction with another like truck for the transportation of articles too heavy or too elongated for one truck, and which will permit the ready turning of corners.

In accordance with the present invention there is provided a wheeled truck frame conforming generally to the ordinary warehouse hand truck but provided at the wheel end, that is the end remote from the handle or manipulating end, with a turn-table structure, whereby the truck frame may be swung to one side or the other with relation to a load on the turn-table structure, so that where two trucks are employed for the transportation of a heavy article the truck bodies may be swung in the proper direction to permit the turning of a corner without the necessity of removing the load from the truck or crowbarring the load around, as would be necessary with trucks of ordinary construction.

In order to facilitate the operation of the truck it is provided with caster or swivel wheel supports near the handle ends, and a locking means whereby the turn-table may be held in fixed relation to the frame of the truck when so desired, so that the truck may be used in the same manner as the common form of warehouse trucks.

The invention will be best understood from a consideration of the following detailed description taken in connection with the accompanying drawings forming a part of this specification, with the understanding, however, that while the showing of the drawings is of a practical embodiment of the invention, the latter is susceptible of other embodiments varying in details of construction and arrangement of parts from the particular showing of the drawings, and, therefore, the invention is not limited to the exact embodiment shown.

In the drawings:—Figure 1 is a plan or top view of a truck embodying the present invention, showing the turn-table in dotted lines in an angular position with reference to the length of the truck. Fig. 2 is a bottom plan view of the turn-table removed from the truck. Fig. 3 is a section on the line 3—3 of Fig. 1. Fig. 4 is a side elevation of the truck when resting upon a floor or other like support. Fig. 5 is a section on the line 5—5 of Fig. 1. Fig. 6 is a section on the line 6—6 of Fig. 7. Fig. 7 is an elevation of a portion of the inner face of one of the side members of the truck frame, showing a latch structure employed. Fig. 8 is a section on the line 8—8 of Fig. 1. Fig. 9 is an elevation showing a modified form of the latch operating means.

Referring to the drawings, there is shown a truck frame composed of longitudinal side members 1 and cross members 2 holding the side members in spaced relation, usually parallel one with the other after the ordinary practice in constructing warehouse hand trucks. One end of each side member is formed into a curved handle 3 also in conformity with the usual practice, and at the other ends the two side members carry journal bearings 4 for an axle 5 extending beyond the side members and there receiving truck wheels 6, all in accordance with the usual construction of warehouse trucks.

Between the front or wheeled end of the side members of the truck frame there is mounted a plate 7 which may extend from the front ends of the side members, which together with the plate at this point are usually beveled, to a point a sufficient distance back from the front end where the rear edge 8 of the plate 7 may be rounded on an arc struck from the center of a passage 9 near the middle of the plate. Lugs 10 may be formed at the sides of the plate 7 to receive securing bolts 11 passing through the side members 1 of the truck frame, or any other suitable means may be employed for fastening the plate 7 to the truck frame.

That surface of the plate 7 which may be termed the upper surface is formed with, or has secured thereto a circular flange 12 concentric with the center of the opening 9. There is provided another plate 13 in the nature of a turn-table and conforming in size and general shape to the plate 7. The plate 13 has formed in what may be termed its under surface an annular groove 14 designed to receive the flange or circular tongue 12 of the plate 7 and this plate 13 has projecting from what may be termed its under surface a central stud 15 designed to extend through the passage 9 and below the same receive a pin or key 16, which will prevent the unintentional lifting of the plate 13 away from the plate 7 or the falling away of the plate 13 from the plate 7 should the truck be overturned. The plate 13 is provided at the front edge with an outstanding retaining lip 17, such as is usually provided on trucks for preventing the movement of the load off the truck when the truck frame is inclined in the usual position in which it is held while being moved from place to place.

In order to provide for the ready turning of the plate 13, which because of its capability of turning may be termed a turn-table, the plate 13 may carry on its under surface, that is the face toward the plate 7, a suitable number of anti-friction rollers 18 or other anti-friction devices, the stud 15 and flange 14 constraining the plate 13 to move about the axis of the stud 15, the plate 13 being rotatable to any desired extent about such axis.

For purposes of lightness without unnecessary sacrifice of strength, the plate 13 may be of skeleton type, being provided with a suitable number of openings 19 and the lip 17 may have like openings 19, these openings being of ornamental shape and disposition if such be desired.

As will hereinafter appear, the rotatability of the turn-table is of importance, but when the truck is used in the ordinary way, as a hand truck, it is desirable that the turn table be positively held against rotation, and for this purpose the turn-table has formed in one edge a notch or recess 20, while pivotally secured to the inner face of one of the side members 1 there is a latch lever 21 having one end 22 shaped to enter the notch 20 and adapted to hold the turntable 13 when seated in the notch in such position that the lip 17 is lateral to the length of the truck in the position there occupied by the corresponding lip of ordinary trucks. Formed on the end 22 of the lever 21 is a stud 23 and fast to the side member 1 to which the lever 21 is secured is another stud member 24, these two stud members serving to confine between the lever and the side member a spring 25 urging the latch member into engagement with the notch 20 but yielding when the turn-table is moved from its normal position, the engaging end 22 of the latch lever then riding on the under portion of the turn table with the spring 25 compressed. The end of the lever 21 remote from the end 22 is appropriately bent as shown at 26 to underride the corresponding side member 1 and is provided with an angle extension 27 in position to be engaged by the foot of the operator, but protected by the side member 1 from accidental movement, being ordinarily out of the way of any obstruction.

The middle portion of the turn-table 3 where formed with the groove 12 may be thicker than the peripheral portion for strength and the periphery of the turn table may be formed with a stiffening flange 28 in which the notch 20 may be produced. These are matters of design and may be varied within wide limits.

Attached to the side members 1 near the handle ends and preferably coincident with the cross piece 2 there are located brackets 29 preferably formed with three legs for attachment to the cross piece and to the side pieces, and each bracket may be provided with an intermediate boss 30 formed with a passage for a pintle 31 on the yoke of a caster wheel 32, said caster wheel being held in place by a pin 33 traversing it beyond the end of the boss 30 remote from the wheel 32. Any other form of caster structure may be employed, but the one described is efficient. There are preferably two caster wheels provided under the respective side pieces 1 and cross piece 2 adjacent the handle ends of the truck frame.

When it is desired to move a heavy article requiring two trucks and it becomes necessary in the transportation of the article on the trucks to turn a corner, the trucks on reaching the corner may be lowered, so that the caster wheels rest upon the floor or other support and the turn-table or plate 13 may be unlatched from the frame of the truck and the latter may be turned to one side or the other as necessary, and then the trucks may be moved ahead along a new path and when the corner is turned may be again brought into the first position with relation one to the other and the turntables again latched, when the handle ends of the trucks may be elevated as before and the load propelled to the point of deposit, or if it is necessary to turn other corners, the same proceeding is repeated, there being no necessity at any time of removing the load from the trucks or the employment of a crowbar to change the line of travel, the swivel plate or turn-table 13 permitting the turning of the trucks with ease.

When the turn-table is locked to the body of the truck by the latch lever 21, the truck may be used in the ordinary manner of the common warehouse hand truck.

It is sometimes desirable to operate the latch by hand instead of by the foot, and then the foot piece 27 may be replaced by an eye to which is attached a rod 27ᵃ extending along the corresponding side piece 1 to the handle end 3 thereof, as shown in Fig. 9, in position to be readily grasped by the hand of the operator.

What is claimed is:—

1. A hand truck comprising an elongated frame having handles at one end and supporting wheels at the other end spaced apart laterally of the truck, and a swiveled load retaining plate or turn table mounted on the wheeled end of the truck, said plate being provided along one edge of the load receiving face with an outstanding load retaining flange or lip of a length substantially the same as the width of the truck and tangential to an arc struck from the axis of the plate, the said lip or flange outstanding from the plane of the plate at an angle thereto, and said load receiving face being otherwise wholly free from obstruction.

2. A hand truck comprising a frame composed of longitudinal side members and cross members holding the side members in spaced relation with one end of each side member formed into a handle, supporting wheels at the end of the truck frame remote from the handles and disposed exterior to the side members, a plate extending between and secured at the side edges to the side members of the truck frame at that end of said frame provided with the supporting wheels, and another plate mounted on and swiveled to the first named plate and having one edge on the face remote from the first named plate provided with an outstanding load retaining lip or flange integral therewith and substantially tangential to an arc struck from the axis of the movement of the second plate, the remainder of the said face of the second plate being wholly free from obstruction.

3. A hand truck comprising an elongated frame having handles at one end and spaced supporting wheels at the other end, a swiveled load retaining plate or turn table mounted on the truck at the wheeled end thereof and provided with an outstanding load retaining flange or lip at one edge of a length substantially that of the width of the plate and arranged tangential to an arc struck from an axis of the swivel plate, and a latch adjacent the wheeled end of the truck having one end in operative relation to the swiveled plate and the other end formed with a portion to be engaged by the foot of an operator to move the latch to release position.

4. A hand truck comprising an elongated frame having laterally separated side members and supporting wheels at one end exterior to the side members and the latter having handles at the end remote from the wheels, a plate extending across and secured at the side edges to the side members of the frame of the truck at the wheeled end, another plate swiveled to the first named plate and of a width substantially that of the frame and provided with an outstanding flange across one edge of the plate of a length substantially the same as the width of the truck and at an angle to the load receiving face of the swiveled plate, the said face being otherwise free from obstruction, and a latch for engaging the swiveled plate, said latch having a normal tendency toward the locked position and provided with means accessible to an operator of the truck for releasing said plate, the latch coöperating with the swiveled plate to lock the same in a single intermediate position.

5. A hand truck provided with handles at one end and laterally spaced supporting wheels at the other end, a plate on and swiveled to the wheeled end of the truck and provided along one edge with an outstanding lip or flange of a length substantially the same as the width of the truck and at an angle to the plane of the load receiving face of the truck, said face being otherwise unobstructed, and a locking means for the plate in position to be accessible to the operator of the truck and having a constant tendency toward the locking position, the latch and plate having coacting parts for locking the plate against movement solely in the centralized position of the plate with the flange extending at substantially right angles to the longitudinal center line of the truck.

In testimony, that I claim the foregoing as my own, I have hereto affixed my signature in the presence of two witnesses.

SIMON C. JOHNSON.

Witnesses:
GEORGE H. MILLER,
ALLEN C. HINDS.

---

Copies of this patent may be obtained for five cents each, by addressing the "Commissioner of Patents, Washington, D. C."